(12) United States Patent
Jewell et al.

(10) Patent No.: US 7,179,348 B2
(45) Date of Patent: Feb. 20, 2007

(54) METHOD FOR PRODUCING CELLULOSE FIBER HAVING IMPROVED BIOSTABILITY AND THE RESULTING PRODUCTS

(75) Inventors: Richard A. Jewell, Bellevue, WA (US); Julie A. Reimer, Seattle, WA (US)

(73) Assignee: Weyerhaeuser Company, Federal Way, WA (US)

( * ) Notice: Subject to any disclaimer, the term of this patent is extended or adjusted under 35 U.S.C. 154(b) by 757 days.

(21) Appl. No.: 10/228,815

(22) Filed: Aug. 27, 2002

(65) Prior Publication Data

US 2003/0041983 A1    Mar. 6, 2003

Related U.S. Application Data

(63) Continuation of application No. 09/838,947, filed on Apr. 19, 2001, now abandoned.

(60) Provisional application No. 60/199,344, filed on Apr. 24, 2000.

(51) Int. Cl.
*D21H 21/36* (2006.01)
*D21H 17/07* (2006.01)
*D21H 17/66* (2006.01)

(52) U.S. Cl. .......................... 162/161; 162/10; 162/72; 162/79; 162/164.6; 162/181.2; 162/182

(58) Field of Classification Search ................ 162/161, 162/159, 160, 9, 10, 25, 26, 70, 72, 79, 158, 162/164.6, 181.1, 181.2, 181.3, 182; 424/405, 424/411, 413, 630, 638; 428/364, 379, 389, 428/393, 902
See application file for complete search history.

(56) References Cited

U.S. PATENT DOCUMENTS 5,049,383 A * 9/1991 Huth et al. ................. 424/405
5,462,589 A * 10/1995 Nicholas et al. ........... 106/18.33
5,730,907 A * 3/1998 Schultz et al. ............. 252/400.62
6,676,745 B2 * 1/2004 Merkley et al. ............. 106/726

FOREIGN PATENT DOCUMENTS

| CA | 1 134 564 | * | 2/1982 |
| WO | WO 98/05206 | * | 2/1998 |

* cited by examiner

*Primary Examiner*—Eric Hug
(74) *Attorney, Agent, or Firm*—Christensen O'Connor Johnson Kindness

(57) ABSTRACT

A cellulose fiber having extended biostability and the method of its manufacture are described. While prior treatments of cellulose with biotoxic metal compounds have given improved resistance to decay, these treatments have not been entirely satisfactory where the fiber had to be refined before use. Refining energy was very high and fiber length loss was substantial. Treatment of cellulose fiber with didecyldimethylammonium chloride (DDAC) or bromide (DDAB), these materials in combination with low levels of copper, or low levels of copper alone, has given a product with very good biostability without a major increase in refining energy or loss of fiber length. The treated fiber is particularly advantageous as a reinforcing component for cement board products.

6 Claims, No Drawings

METHOD FOR PRODUCING CELLULOSE FIBER HAVING IMPROVED BIOSTABILITY AND THE RESULTING PRODUCTS

This application is a continuation of application Ser. No. 09/838,947, filed Apr. 19, 2001, and now abandoned, which claims the benefit of U.S. provisional application 60/199,344, filed Apr. 24. 2000.

The present invention is directed to a cellulose fiber having excellent resistance to environmental degradation, and to its method of preparation.

BACKGROUND OF THE INVENTION

Fiber reinforced cement board products used as building materials have been in service since the second decade of the 1900s. Portland cement serves as a matrix or binder for wood particles or strands. In turn, the particles significantly reduce density and contribute strength, particularly tensile strength, to the product. Earlier products were made using wood excelsior as a reinforcing material. Later, asbestos fiber was widely used as a reinforcing fiber. The fiber is intimately mixed into a Portland cement-water slurry so that it is evenly coated. This mixture is predominantly formed into flat panels where the cement is allowed to cure before use. Alternatively, three dimensional products such as corrugated panels, roof tiles, and pipes can be made. Panels can be made with varying densities. Low density products find interior applications as sound absorbent products for walls and ceilings. Higher density panels are used as flooring, siding, sheathing, and concrete forms. For many years asbestos reinforced simulated shingles were widely used as siding for home construction. This application largely disappeared after the health problems associated with asbestos were uncovered. Today, cement board reinforced with cellulose fiber has made a significant comeback as a home siding product. In this application it simulates horizontal or vertical wood siding. Although the product requires special saws, it can otherwise be conventionally handled and nailed. Cement board siding is accepted as an attractive durable, dimensionally stable, low maintenance product resistant to moisture, decay, and insects.

Unbleached kraft pulps are predominantly used as the fiber source for cement board siding. Soroushian et al., in *Inorganic-Bonded Wood and Fiber Composite Materials*, A. A. Moslemi ed., 3: 9–19 Forest Products Society (1993) (hereafter *IBWFCM*), generally describe the process of manufacture and properties of the resulting products. Similarly, Soroushian et al., in *IBWFCM.*, 5: 3–7 (1997), describe a process for accelerated curing of the products by autoclaving in high pressure steam. Detailed layouts of plants for fiber reinforced cement board production are given by K. Buchmayer, *IBWFCM* 6: 99–140 (1998), and G. Agansky, *IBFWCM* 6: 141–146, (1998). Briefly a slurry of the cellulose fibers is formed. Separately a slurry of cement, silica, filler, and other additives is prepared. These are mixed and formed into sheets or panels, usually on an endless wire screen, where they are then dewatered. The dewatered panels are trimmed, pressed, and stacked. They are then autoclaved to accelerate hydration of the cement and induce at least sufficient strength so that the panels can be handled without breakage. Post curing and finishing are usually additional manufacturing steps before the panels are shipped.

Today, the Hatschek wet process is the most widely used production method. An aqueous slurry of fiber and cement with about 7–10% solids is formed into sheets on several rotating cylinders. Several thin layers are superposed until a panel of the desired thickness is formed. This is dewatered and cured as described above (see *Concrete Technology and Design: Natural Fibre Reinforced Cement and Concrete*, R. N. Swamy, ed., Vol. 5, pp 23–25, Blackie, London). Typically about 10–30% by weight of the composite material will be refined cellulose fibers with the balance being inorganic mineral components.

The manufacturing environment for cement bonded panels is very highly alkaline. As was noted, unbleached kraft fiber is frequently used as reinforcement. Two problems have been attributed to use of kraft fiber, one during manufacturing and one during use. The first is due to alkaline leaching of materials not removed from the fiber in the pulping process. These materials are generally degraded lignin and carbohydrate residues. When present in excessive amounts they interfere with the curing process and can deleteriously affect strength of the finished product. Under some use conditions the fiber is subject to biological attack also resulting in weakening the product.

The present inventors are aware that some previous consideration has been given to control biological degradation of cellulosic reinforcement in cement board products. They would note that chromated copper arsenate (CCA) treated wood particles have been used. This use has not been with any intention of making biologically durable products but as a way of disposing of scrap or out-of-service CCA treated wood which is not suitable for use as fuel (see Hsu *IBFWCM* 4: 3–5 (1995), and P. A. Cooper et al. *IBFWCM* 6: 340–348 (1998)). The authors concluded that CCA treated red pine was useable when comminuted into particles and that the product could be made so that leaching of the toxic materials was minor. Goodell et al., in *Forest Products Journal* 47(11/12): 75–80 (1997), explored subsoil decay resistance of three wood-cement composite materials. They concluded that only wood particles in the surface regions would likely be subject to fungal attack. Japanese Patent Application 4333611 describes a cross linked acrylic fiber which may be made from monomers that include multivalent metal acrylates. When the multivalent metals in the fiber are copper or zinc the fibers have antibacterial properties. There was no suggested use of the fiber as a cement board reinforcement. Japanese Patent 11-181619 describes a polypropylene fiber useful in cement boards. The fiber is resistant to autoclaving at temperatures as high as 170°–180° C. The fiber is melt spun with a zinc containing nucleating agent, said to contribute antimicrobial properties. Japanese Patent 3132552 describes a cement board fiber containing 3–40% wood fiber having high durability. The fiber is impregnated or coated with a metal compound selected from copper, zinc, aluminum or lead chloride or sulfate. Japanese Patent Application 288149/87 describes wood reinforced cement boards in which a salt of iron, copper, lead, zinc, or aluminum is added to the mixing water. The salt is said to react with components leached from the wood chips and to prevent hardening retardation caused by the leachates. No mention was made of improvement in resistance to biological degradation.

Canadian Patent 1,134,564 describes cellulose fibers which are treated for fungal resistance with metal oxide acylates in which the metal is selected from aluminum, titanium, copper, zinc, antimony, chromium, iron, manganese, or zirconium. Alternatively, other organic and inorganic metal compounds of copper, mercury, chromium, tin, and zinc were said to be useful. The treated fibers are suggested for use as an asbestos substitute in cement products, brake linings, gaskets, etc.

A significant problem with cellulose fibers treated with heavy metal biocides is that they require a high energy input and are subject to considerable degradation during the refining process required for the manufacture of cement board products. The present invention has addressed and presents a solution to this problem.

SUMMARY OF THE INVENTION

The invention is directed to a fibrous cellulose product resistant to biological degradation, and to the method of making the product. It has been unexpectedly discovered that cellulose fiber treated with a compound selected from didecyldimethylammonium chloride (DDAC) or bromide (DDAB), DDAC or DDAB combined with small amounts of copper, or very low levels of copper alone, offers excellent protection against biological deterioration when used as reinforcement in cement board products. The fiber does not require significantly increased energy input levels or have serious fiber length degradation during refining. The amount of the copper compound included is below that at which significant interference with refining occurs.

DDAC and DDAB are useful in the range of 0.1%–2%, based on the dry weight of fiber present with 0.5%–1.0% being the preferred usage. Copper, as Cu based on weight of dry fiber, may be used in the range of about 0.01%–0.25% either alone or in combination with DDAC or DDAB. This may be added as any water soluble copper salt. The copper becomes permanently fixed on/in the fiber after exposure to the highly alkaline conditions encountered after mixing with Portland cement.

While an unbleached kraft fiber is a preferred raw material because of its strength and cost, other chemically pulped cellulose fibers are known to be equally suitable. These include bleached kraft pulps, and bleached and unbleached sulfite and semichemical pulps, such as chemithermomechanical pulps. When used as a reinforcement for cement board products there is little incentive to use the more expensive bleached pulps even though their technical performance is equivalent to the unbleached fibers.

The term "cement board products" should be read with sufficient breadth to include flat panels or strips, corrugated panels, and cellulose fiber reinforced cement pipe. These products include those used for siding, roofing and tile backer among many others.

It is an object of the invention to provide a cellulose fiber having improved biostability that may be refined without significantly increased energy input.

It is a further object to provide a biostable cellulose fiber that may be refined without significant fiber length loss or fines generation.

It is another object to provide a biostable cellulose fiber particularly suitable for the manufacture of cement board products.

These and many other objects will become readily apparent upon reading the following detailed description of the invention.

DETAILED DESCRIPTION OF THE PREFERRED EMBODIMENTS

Samples for testing were prepared by obtaining unbleached mixed conifer kraft pulp sheets produced in an interior British Columbia mill. The sheets were essentially unrefined and had a basis weight of about 900 g/m$^2$. Solutions of various biocides were made up so that the desired ultimate concentration of active material would be obtained by spraying each sample portion of pulp sheet with about 1 g of the biocidal solution per gram of pulp. The treated sheets were then air dried to fix the active ingredient. Subsequently the treated sheets were reslurried in water having a pH ~12 obtained from a cement board manufacturing facility and refined to a Canadian Standard Freeness (CSF) level of 450 mL. All refining was done in a pilot scale Model 202 Claflin refiner (available from Bolton-Emerson, Inc., Lawrence, Mass.). The treated and refined pulp was dewatered by centrifuging to a consistency of about 30% and then pin fluffed to ensure uniformity.

Treatments included copper sulfate at concentrations of 0.1, 0.3, and 0.5% Cu w/w based on dry pulp; zinc sulfate at concentrations of 0.1%, 0.3%, and 0.6% Zn; 0.2% propiconazole emulsion; didecyldimethylammonium chloride (DDAC) 0.2%, 0.5%; and 1.0%, and 1.0% DDAB. Treated fibers were also made using 1.0% DDAC with 0.05%, 0.10%, and 0.2% Cu added as copper sulfate. All concentrations are on a weight/weight basis.

EXAMPLE 1

Examination of Samples for Biodurability

Samples of 30 g of the treated pulps were reslurried in water and formed into sheets in an 8×8 inch (203×203 mm) sheet. The sheets were pressed to remove excess moisture then air dried. Each sheet was then cut in half and dipped for 30 seconds in a slurry of one part Portland cement in three parts by weight water. The coated and impregnated sheets were removed and drained, allowed to cure for two days wet, and then air dried. Each 4×8 inch (151×203 mm) cement treated sheet was then enclosed in a 20 mesh stainless steel screen and half buried in the ground at a test site at Hilo, Hi. Samples were then removed after three month, six month, nine month, and twelve month periods for examination. Exposed sheets were assigned a subjective rating for deterioration based on visual observation (3=sound and 0=complete deterioration). The exposed sheets were also examined microscopically to determine the presence of fungal mycelium and cell wall deterioration. Results of these tests are seen in Tables 1, 2, 3, and 4.

TABLE 1

Results of 3 Months Inground Testing

| Sample Treatment | Above Ground Rating | Below Ground Rating | Fungi Presence Above Ground | Fungi Presence Below Ground |
|---|---|---|---|---|
| None | 3 | 1 | Yes—high | Yes—low |
| CuSO$_4$ – 0.1% Cu | 3 | 3 | Yes—vy. low | Yes—vy. low |
| CuSO$_4$ – 0.3% Cu | 3 | 3 | No | No |
| CuSO$_4$ – 0.5% Cu | 3 | 3 | Yes—vy. low | No |
| ZnSO$_4$ – 0.1% Zn | 3 | 1 | Yes—low | Yes—medium |
| ZnSO$_4$ – 0.3% Zn | 3 | 1 | Yes—low | Yes—low |
| ZnSO$_4$ – 0.6% Zn | 3 | 1 | Yes—low | Yes—medium |
| Propiconazole – 0.2% | 3 | 1 | Yes—low | Yes—medium |
| DDAC – 0.2% | 3 | 2 | Yes—high | Yes—med. high |
| DDAC – 0.5% | 2 | 2 | No | No |
| DDAC – 1.0% | 3 | 2.5 | No | Yes—vy. low |
| DDAB – 1.0% | 3 | 3 | No | No |
| DDAC – 1.0% + 0.05% Cu | 3 | 2.2 | — | — |

TABLE 1-continued

Results of 3 Months Inground Testing

| Sample Treatment | Above Ground Rating | Below Ground Rating | Fungi Presence Above Ground | Fungi Presence Below Ground |
|---|---|---|---|---|
| DDAC – 1.0% + 0.1% Cu | 3 | 3 | — | — |
| DDAC – 1.0% + 0.2% Cu | 3 | 2.5 | — | — |

Rating of 3 indicates sound. Rating of 0 indicates complete deterioration.

TABLE 2

Results of 6 Months Inground Testing

| Sample Treatment | Above Ground Rating* | Below Ground Rating* | Fungi Presence Above Ground | Fungi Presence Below Ground |
|---|---|---|---|---|
| None | 2 | 0 | Yes—low | No |
| $CuSO_4$ – 0.1% Cu | 3 | 1.5 | Yes—vy. low | Yes—high |
| $CuSO_4$ – 0.3% Cu | 3 | 3 | No | No |
| $CuSO_4$ – 0.5% Cu | 3 | 3 | No | Yes—vy. low |
| $ZnSO_4$ – 0.1% Zn | 3 | 1 | Yes—vy. low | Yes—med. high |
| $ZnSO_4$ – 0.3% Zn | 3 | 1.3 | Yes—med. low | Yes—med. low |
| $ZnSO_4$ – 0.6% Zn | 3 | 0.5 | Yes—high | Yes—med. high |
| DDAC – 0.2% | 2.8 | 0.5 | — | — |
| DDAC – 0.5% | 3 | 1 | — | — |
| DDAC – 1.0% | 3 | 2 | — | — |
| Propiconazole – 0.2% | 3 | 0.5 | Yes—vy. low | Yes—low |
| DDAB – 1.0% | 2 | 2.8 | Yes—vy. low | Yes—vy. low |
| DDAC – 1.0% + 0.05% Cu | 3 | 0 | — | — |
| DDAC – 1.0% + 0.1% Cu | 3 | 1 | — | — |
| DDAC – 1.0% + 0.2% Cu | 3 | 1 | — | — |

*Average of two tests. Rating of 3 indicates sound. Rating of 0 indicates complete deterioration.

TABLE 3

Results of 9 Months Inground Testing

| Sample Treatment | Above Ground Rating* | Below Ground Rating* |
|---|---|---|
| None | 1.5 | 0 |
| $CuSO_4$ – 0.1% Cu | 3 | 1.5 |
| $CuSO_4$ – 0.3% Cu | 3 | 2.3 |
| $CuSO_4$ – 0.5% Cu | 3 | 2.5 |
| $ZnSO_4$ – 0.1% Zn | 2.3 | 0 |
| $ZnSO_4$ – 0.3% Zn | 3 | 0.8 |
| $ZnSO_4$ – 0.6% Zn | 2 | 0 |
| Propiconazole – 0.2% | 2.8 | 0.5 |
| DDAB – 1.0% | 3 | 1.3 |
| DDAC – 0.2% | 2.8 | 0 |
| DDAC – 0.5% | 2.5 | 0 |
| DDAC – 1.0% | 3.0 | 1.5 |
| DDAC – 1.0% + 0.05% Cu | 2.3 | 0 |
| DDAC – 1.0% + 0.1% Cu | 3 | 0 |
| DDAC – 1.0% + 0.2% Cu | 3 | 0 |

*Average of two tests. Rating of 3 indicates sound. Rating of 0 indicates complete deterioration.

Based on the test conditions employed, effective below ground protection was given by copper at concentrations of 0.3% or greater; DDAB at 1% (lower concentrations not tested); and DDAC at 0.5% or greater. Addition of copper to 1.0% DDAC did not increase below ground protection at nine months. Zinc compounds or propiconazole at 0.2% did not give effective decay protection at any concentration tested.

TABLE 4

Results of 12 Months Inground Testing

| Sample Treatment | Above Ground Rating* | Below Ground Rating* |
|---|---|---|
| None | 2.3 | 0 |
| $CuSO_4$ – 0.1% Cu | 2.3 | 0.5 |
| $CuSO_4$ – 0.3% Cu | 2 | 1 |
| $CuSO_4$ – 0.5% Cu | 3 | 2.3 |
| $ZnSO_4$ – 0.1% Zn | 2 | 0 |
| $ZnSO_4$ – 0.3% Zn | — | — |
| $ZnSO_4$ – 0.6% Zn | 1.5 | 0 |
| Propiconazole – 0.2% | 2.3 | 0 |
| DDAB – 1.0% | — | — |
| DDAC – 0.2% | — | — |
| DDAC – 0.5% | — | — |
| DDAC – 1.0% | — | — |
| DDAC – 1.0% + 0.05% Cu | 2.8 | 0 |
| DDAC – 1.0% + 0.1% Cu | 3 | 0 |
| DDAC – 1.0% + 0.2% Cu | 3 | 0 |

*Average of two tests. Rating of 3 indicates sound. Rating of 0 indicates complete deterioration.

Only copper was effective in reducing cellulose fungal decay after the one year underground tests. It should be noted that burial in surface soil in a semitropical environment is a very severe accelerated aging test. The only cement board product likely to experience such an environment would be pipe. However, the test should be indicative of long term durability above ground. With the exception of samples treated with only copper, the DDAC and DDAB treated material performed as well as any of the other treatments. This treated fiber offers significant advantages in refining energy and fiber length retention as compared with copper, as will be seen in the following examples.

EXAMPLE 2

Claflin Refining Tests of Biocidally Treated Pulps

Refining tests were run in duplicate on pulp samples prepared as in the previous example to determine energy input to constant freeness and evaluate the resulting fiber for damage. Refining times were adjusted to attempt to get a freeness of about 450 mL C.S.F. In addition to the samples evaluated earlier, samples of DDAC with 0.05%, 0.10%, and 0.20% copper were tested. Results are given in Table 5.

TABLE 5

Results of Claflin Refining Tests

| Sample Treatment | Refining Energy, MJ/t | CS Freeness, mL | Length Weighted Fiber Length, mm | Length Weighted Fines <0.2 mm, % |
|---|---|---|---|---|
| Untreated[1] | 920 | 450 | 2.31 | 4.8 |
| Zinc sulfate – 0.1% Zn | 960 | 450 | 2.31 | 5.0 |

TABLE 5-continued

Results of Claflin Refining Tests

| Sample Treatment | Refining Energy, MJ/t | CS Freeness, mL | Length Weighted Fiber Length, mm | Length Weighted Fines <0.2 mm, % |
|---|---|---|---|---|
| Zinc sulfate – 0.3% Zn | 970 | 500 | 2.21 | 5.2 |
| Zinc sulfate – 0.6% Zn[2] | 1015 | 450 | 2.20 | 5.7 |
| Propiconazole – 0.2% | 980 | 460 | 2.18 | 5.6 |
| Copper sulfate – 0.1% Cu | 1060 | 480 | 2.14 | 6.0 |
| Copper sulfate – 0.3% Cu | 1410 | 470 | 1.61 | 8.0 |
| Copper Sulfate – 0.5% Cu | 2100 | 480 | 1.59 | 8.8 |
| Untreated[3] | 1251 | 460 | 2.35 | 5.2 |
| 1% DDAC + 0.05% Cu | 1340 | 474 | 2.23 | 5.8 |
| 1% DDAC + 0.10% Cu | 1480 | 450 | 2.12 | 5.8 |
| 1% DDAC + 0.20% Cu | 1960 | 465 | 1.98 | 6.7 |

[1] Average of four samples at different production times.
[2] Average of three samples.
[3] Different control and pulp sample for DDAC + Cu samples While the two higher levels of copper gave good biological protection, it is immediately evident that the energy needed to refine them was significantly increased over the untreated material. Fiber damage was significant for the two higher levels of copper usage. The zinc and propiconazole samples refined well but their biological protection was poor. The use of up to 0.10% copper alone or with DDAC did not result in any major increase in required refining energy and did not cause unacceptable loss of fiber length.

EXAMPLE 3

Results of Bird Escher Wyss Refining Tests

Samples of the unbleached Canadian kraft pulp used in the earlier tests were made using 0.2%. 0.5%, and 1.0% DDAC based on dry pulp weight. A comparison sample was also made using a copper-chromium treatment with 0.2% Cu and 0.35% Cr, based on dry pulp weight. This latter treatment is one used commercially for wood exposed to conditions causing decay. The samples were refined for this trial in a Model R 1 L Bird Escher Wyss pilot plant scale refiner (available from Bird Escher Wyss, Mansfield, Mass.). Again the attempt was made to refine to a constant freeness value. The copper-chromium treated sample was inadvertently refined somewhat more heavily than desired. Energy consumption results are given in Table 6.

TABLE 6

Results of Escher-Wyss Refining Tests

| Sample Treatment | Refining Energy, MJ/t | CS Freeness, mL | Length Weighted Fiber Length, mm | Length Weighted Fines <0.2 mm, % |
|---|---|---|---|---|
| Untreated[1] | 2640 | 475 | 2.42 | 4.5 |
| Copper chromate – 0.2% Cu and 0.35% Cr | 5440 | 320 | 2.06 | 6.0 |
| DDAC – 0.2% | 2680 | 445 | 2.30 | 6.2 |
| DDAC – 0.5% | 2720 | 448 | 2.30 | 4.9 |
| DDAC – 1.0% | 2740 | 500 | 2.31 | 5.2 |

As in the previous example, there was no serious increase in refining energy of loss of fiber length during refining in the DDAC treated samples. The copper-chromium treated sample required about double the refining energy of the other treated material. While some part of this is due to the lower freeness of this sample, this does not begin to account for the great increase noted. It was also observed that there was considerable leaching of the chromium from this sample.

Further tests have shown that the refined DDAC or DDAC plus copper treated fiber has no inhibiting effect on the cure of concrete products using the fiber as reinforcement. The treated fibers handled normally in every respect and were fully equivalent in manufacturing performance and product physical properties to untreated material. However, as noted in Tables 1–3, durability under environmental conditions that might induce fiber decay was greatly improved for the DDAC treated fibers.

It will be apparent to those skilled in the art that many variations in the preparation and use of the products of the invention could be made that have not been described herein. It is the intention of the inventors that these variations should be included within the scope of the invention if encompassed within the following claims.

The invention claimed is:

1. A cellulose fiber product resistant to biological degradation which comprises cellulose fibers derived from wood, the fibers initially being at least partially purified by a chemical pulping process, the product containing a biocidally effective amount of 0.01–0.25% copper by weight of dry fiber and 0.1–2.0% by weight of dry fiber of a compound selected from the group consisting of didecyldimethylammonium chloride, didecyldimethylanimonium bromide, and mixtures thereof, the fiber product being resistant to fiber length degradation during refining.

2. The cellulose fiber product of claim 1 in which the didecyldimethylanimonium chloride, didecyldimethylammonium bromide, or mixture thereof is present in the fiber product in an amount of 0.5–1.0% by weight of dry fiber.

3. The cellulose fiber product of claim 1 in which the biocidal compound is didecyldimethylanimonium chloride.

4. The cellulose fiber product of claim 1 in which the biocidal compound is didecyldimethylammonium bromide.

5. The cellulose fiber product of claim 1 in which the cellulose fiber is selected from the group consisting of bleached and unbleached kraft pulps, bleached and unbleached sulfite pulps, bleached and unbleached semichemical pulps, and bleached and unbleached chemithermomechanical pulps.

6. The cellulose fiber product of claim 5 in which the cellulose fiber is an unbleached kraft fiber.

* * * * *

UNITED STATES PATENT AND TRADEMARK OFFICE
CERTIFICATE OF CORRECTION

PATENT NO.      : 7,179,348 B2                                   Page 1 of 1
APPLICATION NO. : 10/228815
DATED           : February 20, 2007
INVENTOR(S)     : Jewell et al.

It is certified that error appears in the above-identified patent and that said Letters Patent is hereby corrected as shown below:

Col. 8, Line 47, should read as follows:

monium chloride, didecyldimethylammonium bromide, and

Col. 8, Line 51, should read as follows:

didecyldimethylammonium chloride, didecyldimethylam-

Col. 8, Line 53, should read as follows:

biocidal compound is didecyldimethylammonium chloride

Signed and Sealed this

Third Day of July, 2007

JON W. DUDAS
*Director of the United States Patent and Trademark Office*